(12) United States Patent
Noguchi

(10) Patent No.: US 10,014,754 B2
(45) Date of Patent: Jul. 3, 2018

(54) ROTARY DEVICE

(71) Applicant: Murata Manufacturing Co., Ltd., Nagaokakyo-shi, Kyoto-fu (JP)

(72) Inventor: Masumi Noguchi, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/383,177

(22) Filed: Dec. 19, 2016

(65) Prior Publication Data

US 2017/0104394 A1 Apr. 13, 2017

Related U.S. Application Data

(63) Continuation of application No. PCT/JP2015/066812, filed on Jun. 11, 2015.

(30) Foreign Application Priority Data

Jun. 20, 2014 (JP) ................... 2014-127297

(51) Int. Cl.
*H02K 1/00* (2006.01)
*H02K 13/00* (2006.01)
*H02K 13/10* (2006.01)
*H02K 13/04* (2006.01)

(52) U.S. Cl.
CPC .......... *H02K 13/006* (2013.01); *H02K 13/04* (2013.01); *H02K 13/10* (2013.01)

(58) Field of Classification Search
CPC ...... H02K 13/006; H02K 13/04; H01R 39/26; H01R 39/38

USPC ....... 310/230, 231, 232, 233, 234, 235, 236, 310/237, 238, 239, 240, 241, 242, 245, 310/246, 248
See application file for complete search history.

(56) References Cited

U.S. PATENT DOCUMENTS

| 4,494,029 A * | 1/1985 | Hoshino | H01R 39/39 310/239 |
|---|---|---|---|
| 2001/0013737 A1* | 8/2001 | Fujii | H01R 39/06 310/233 |
| 2005/0212369 A1* | 9/2005 | Yang | H02K 5/145 310/81 |

(Continued)

FOREIGN PATENT DOCUMENTS

| JP | S5698360 A | 6/1981 |
|---|---|---|
| JP | S61132286 A | 6/1986 |

(Continued)

OTHER PUBLICATIONS

International Search Report issued for PCT/JP2015/066812, dated Aug. 25, 2015.

(Continued)

*Primary Examiner* — Hanh Nguyen
(74) *Attorney, Agent, or Firm* — Arent Fox LLP

(57) ABSTRACT

A rotary device having a brush that includes a slide-contact portion, a fixing section, and a conductive bonding material. The conductive bonding material bonds together the slide-contact portion and the fixing section. The conductive bonding material is composed of an intermetallic compound phase that is an alloy containing one of (1) at least two selected from a first group consisting of Sn, Cu and Ni, and (2) at least two selected from a second group consisting of Sn, Cu, and Mn.

12 Claims, 8 Drawing Sheets

(56) References Cited

U.S. PATENT DOCUMENTS

2013/0233618 A1   9/2013  Nakano et al.
2014/0239767 A1*  8/2014  Schuster ................ H01R 39/04
                                                      310/236

FOREIGN PATENT DOCUMENTS

| JP | H03-114679 A | 5/1991 |
| JP | H09140103 A | 5/1997 |
| JP | 2007324244 A | 12/2007 |
| JP | 2008271743 A | 11/2008 |
| JP | 5018978 B1 | 9/2012 |

OTHER PUBLICATIONS

Written Opinion of the nternational Searching Authority ssued for PCT/JP2015/066812, dated Aug. 25, 2015.

* cited by examiner

ROTARY DEVICE

CROSS REFERENCE TO RELATED APPLICATIONS

The present application is a continuation of International application No. PCT/JP2015/066812, filed Jun. 11, 2015, which claims priority to Japanese Patent Application No. 2014-127297, filed Jun. 20, 2014, the entire contents of each of which are incorporated herein by reference.

FIELD OF THE INVENTION

The present invention relates to a rotary device that converts electric energy into rotational energy or vice versa.

BACKGROUND OF THE INVENTION

Motors (electric motors) and dynamos (generators) have widely been used as rotary devices that convert electric energy into rotational energy and vice versa. The motor converts electric energy into rotational energy (torque) by rotation of the rotor including a commutator. In the motor, resistance loss and slide contact (friction) between the brush and the commutator caused by rotation of the rotor raise the temperature of the brush and the commutator.

In bonding of a brush (first piece) to a supporting portion (second piece) that supports the brush or bonding of a commutator (first piece) to a coil (second piece) as disclosed in Patent Documents 1 to 3, high soldering with a high-temperature solder (high-melting point solder) or brazing are used since the bonded pieces has high melting points.

Patent Document 1: Japanese Patent Application Laid-Open No. S61-132286
Patent Document 2: Japanese Patent Application Laid-Open No. H3-114679
Patent Document 3: Japanese Patent Application Laid-Open No. 2008-271743

SUMMARY OF THE INVENTION

Bonding by brazing or soldering with a high-temperature solder (high-melting point solder) need to be performed at high temperature. This disadvantageously causes thermal damage to a member adjacent to the bonding section.

For example, brazing creates a local-high-temperature area, and the member adjacent to the area deforms or becomes brittle.

The soldering temperature of a high-temperature solder is as high as about 300° C., and the member adjacent to the soldered area deforms or becomes brittle. During soldering with a high-temperature solder, an excessive amount of melted solder might form a ball and fall on a coil or the like to cause a short. Many of high-temperature solders are of Pb-base, which have a problem of the environmental load.

An object of the present invention is to provide a rotary device that reduces thermal damage to a member adjacent to the area where the first piece and the second piece are bonded together.

The present invention provides a rotary device that converts electric energy into rotational energy or vice versa, the rotary device including a first piece having a slide-contact face that contacts a rotating object, a second piece, and a conductive bonding material including an intermetallic compound produced by reaction between first metal which is Sn or an alloy including Sn and second metal which is a CuNi alloy, a CuMn alloy, an AgPd alloy, a CuAl alloy, or a CuCr alloy, wherein the conductive bonding material bonds together the first piece and the second piece.

For example, the intermetallic compound produced by reaction between the first metal and the second metal contains at least two selected from a group of Sn, Cu, and Ni or at least two selected from a group of Sn, Cu and Mn. Specifically, the intermetallic compound is $Cu_6Sn_5$, $Ni_3Sn_4$, $Cu_2NiSn$, for example.

Such an intermetallic compound is produced under a reaction temperature below 300° C., or below the soldering temperature of a high-temperature solder, and has a higher melting point than the high-temperature solder (183° C. to 240° C.)

The intermetallic compound is produced by the reaction between the first metal and the second metal taking place below the soldering temperature of the high-temperature solder to obtain a conductive bonding material. Therefore, chances of the member adjacent to the bonding section being deformed or becoming brittle can be reduced.

A rotary device according to the present invention reduces thermal damage to a member adjacent to the area where the first piece and the second piece are bonded together.

Since the melting point of the intermetallic compound is higher than the melting point of the high-temperature solder (183° C. to 240° C.), the conductive bonding material can be used to bond the portion subjected to a higher temperature than the high-temperature solder.

The conductive bonding material according to the present invention is preferably composed of a porous material.

The conductive bonding material composed of a porous material has a large specific surface area. A large area contacting the air stream produced by the rotation of the rotor increases heat dissipation of the conductive bonding material.

Preferably in the present invention, the first piece constitutes a portion of a brush to serve as a slide-contact portion that contacts a commutator, and the second piece constitutes a portion of the brush to serve as a fixing section.

In the present invention, for example, the first piece takes a form of a brush and the second piece takes a form of a supporting portion that supports the brush.

In the present invention, for example, the first piece takes a form of a commutator and the second piece takes a form of a coil connected to the commutator.

A rotary device according to the present invention reduces thermal damage to a member adjacent to the area where the first piece and the second piece are bonded together.

DETAILED DESCRIPTION OF PREFERRED EMBODIMENTS OF THE INVENTION

A motor according to an embodiment of the present invention will now be described.

Figure 1:
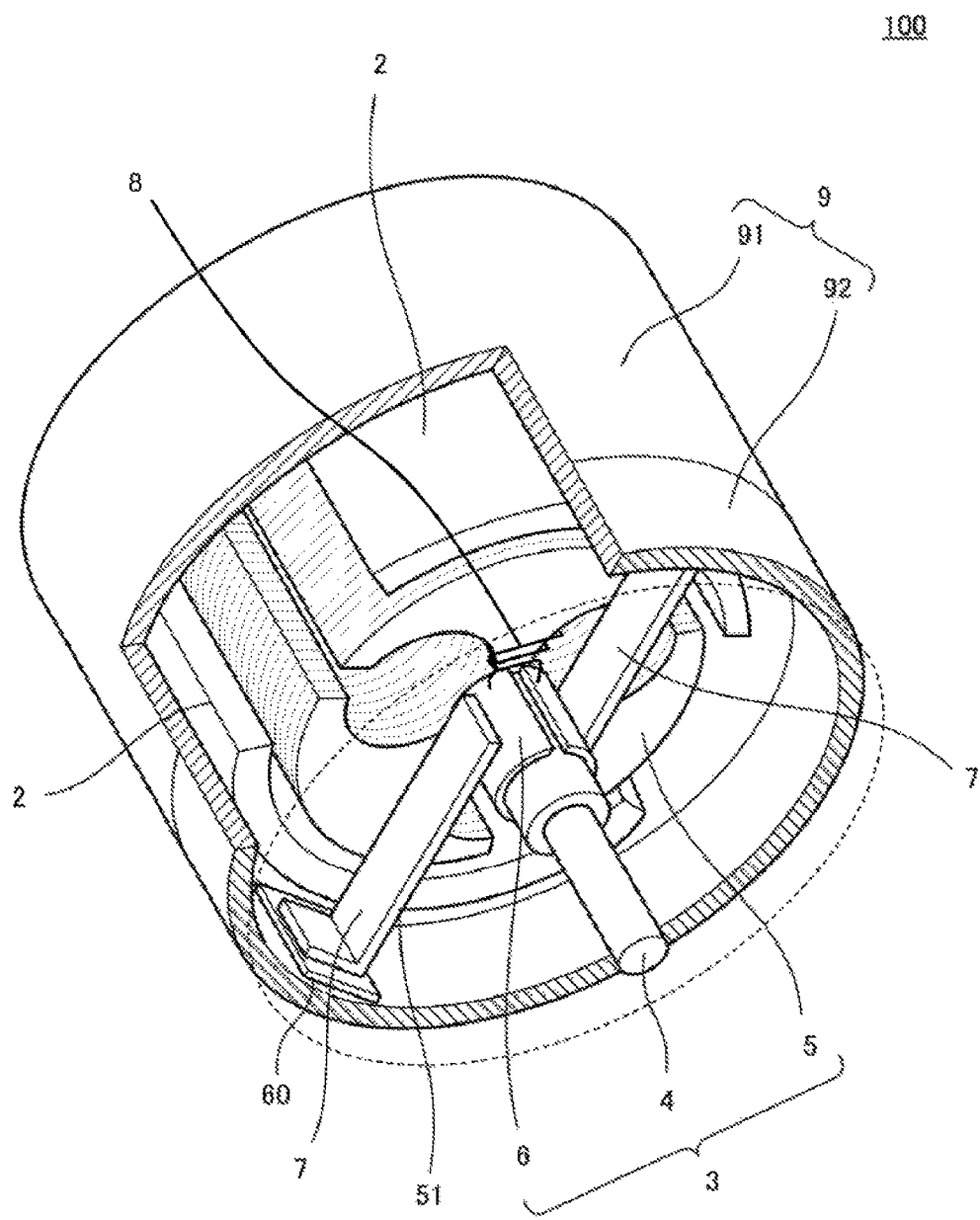
FIG. 1 is an external perspective view of a motor 100 according to an embodiment of the present invention.
Figure 2:
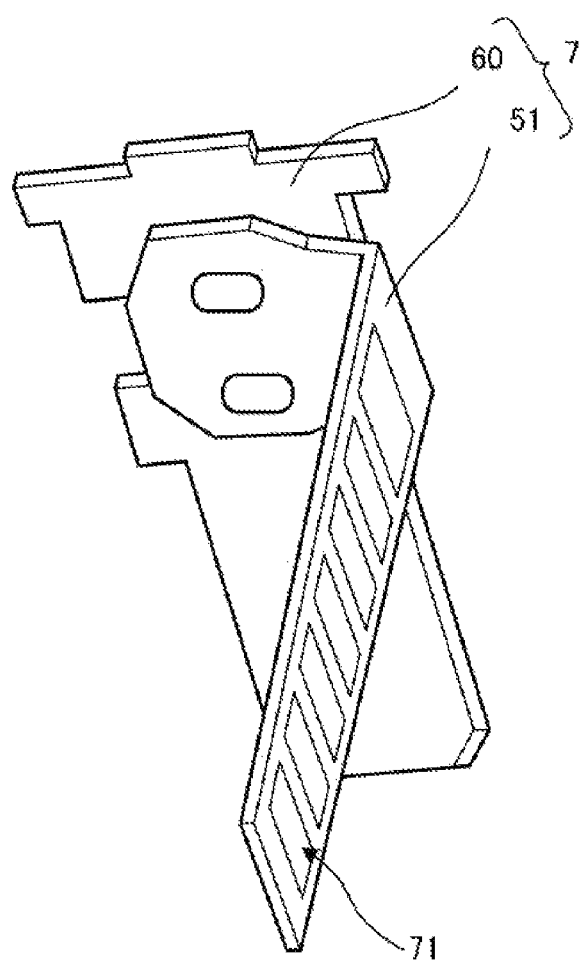
FIG. 2 is an external perspective view of a brush 7 illustrated in FIG. 1.
Figure 3:
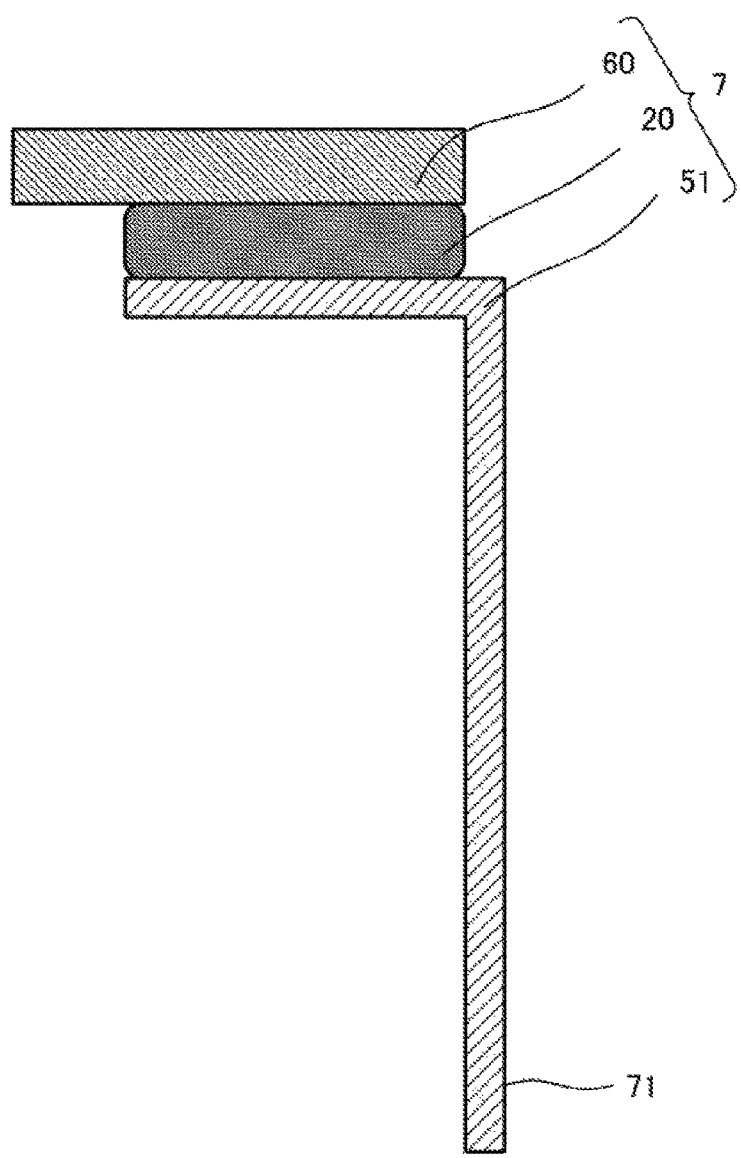
FIG. 3 is a sectional view of the brush 7 illustrated in FIG. 1.
Figure 4:
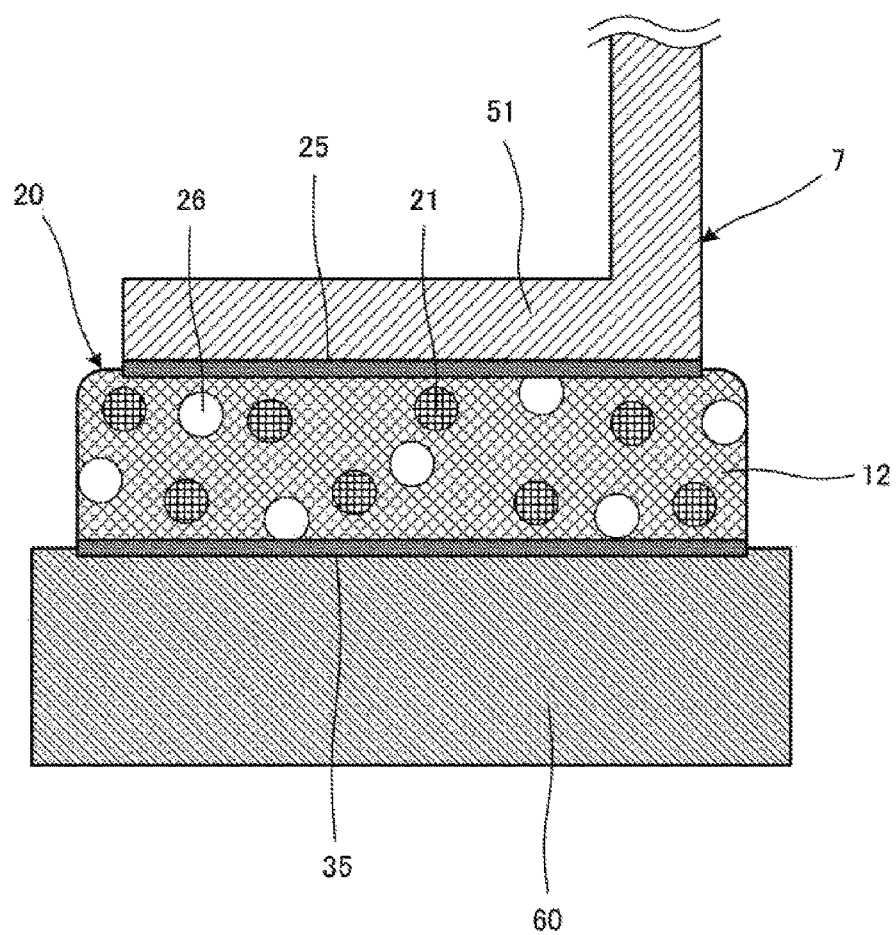
FIG. 4 is an enlarged sectional view of a bonding section that bonds together a slide-contact portion 51 (first piece) and a fixing section 60 (second piece).

FIG. 1 is an external perspective view of a motor 100 according to an embodiment of the present invention. FIG. 2 is an external perspective view of a brush 7 illustrated in FIG. 1. FIG. 3 is a sectional view of the brush 7 illustrated in FIG. 1. FIG. 4 is an enlarged sectional view of a bonding section that bonds together a slide-contact portion 51 (first piece) and a fixing section 60 (second piece).

The motor 100 includes a casing 9, a permanent magnet 2, a rotor 3, and a brush 7. The motor 100 converts electric energy into rotational energy (torque) by rotation of the rotor 3.

The casing 9 houses the permanent magnet 2, the rotor 3, and the brush 7. The casing 9 is composed of a case body 91 and a cap 92. The cap 92 is detachably attached to the case body 91. The permanent magnet 2 is fixed to the inner circumference of the case body 91. A fixing section 60 of the brush 7, which will be described later, is fixed to the inner circumference of the cap 92.

The rotor 3 includes a rotor shaft 4 rotatably supported inside the casing 9, and an armature 5 and commutators 6 electrically connected to a coil 8 of the armature 5 are provided on the rotor shaft 4. The armature 5 is composed of an iron core and a coil 8. Three commutators 6 are each a curved sheet metal taking a form of a segment of a cylinder and are provided on a cylindrical insulating body by integral molding or by bonding with adhesive.

As illustrated in FIGS. 2 and 3, the brush 7 includes the slide-contact portion 51, the fixing section 60, and a conductive bonding material 20.

A flexible conductive metal such as phosphor bronze or nickel silver that can be formed into a spring may be used as the material of the slide-contact portion 51. Regarding conductivity, the material of the slide-contact portion 51 is preferably composed of a metal containing copper. A relatively hard material such as stainless steel may be used as the material of the fixing section 60.

The slide-contact portion 51 of the brush 7 has a slide-contact face 71 that contacts the rotating rotor 3. The commutator 6 also has a slide-contact face that contacts the rotating rotor 3. The brush 7 is always in slide contact with the commutators 6 to make a current flow into the coil of the armature 5. The brush 7 and the commutators 6 reach high temperature by resistance loss and slide contact (friction). Thus, the temperature in the internal space of the casing 9 also becomes high.

As illustrated in FIGS. 3 and 4, the conductive bonding material 20 bonds together the slide-contact portion (the first piece) and the fixing section 60 (the second piece).

The conductive bonding material 20 has as a main phase an intermetallic compound phase 12 produced by chemical reaction between first metal 11 (see FIG. 6) and second metal 21, which will be described later. The conductive bonding material 20 also includes pores 26 and the second metal 21 in the intermetallic compound phase 12.

The first metal 11 is a pure metal of Sn. The second metal 21 is a CuNi alloy. The intermetallic compound phase 12 includes a CuSn-based alloy, a NiSn-based alloy, and a CuNiSn-based alloy. An alloy layer 25 and an alloy layer 35 will be described later.

The conductive bonding material 20 includes as a main phase the intermetallic compound phase 12 obtained by reaction between Sn and a CuNi alloy under the temperature of 250° C. and has a melting point within a range from 300° C. to 600° C. That is, the intermetallic compound phase 12 is produced under a reaction temperature below 300° C., or below the soldering temperature of a high-temperature solder, and has a higher melting point than the high-temperature solder (183° C. to 240° C.)

Thus, in the conductive bonding material 20, deformation as well as formation of brittle structure of the member adjacent to the bonding section can be reduced.

Thermal damage to a member adjacent to the bonding section where the slide-contact portion 51 (the first piece) and the fixing section 60 (the second piece) are bonded together is thus reduced. In particular, an adhesive bonding together each commutator 6 and the rotor shaft 4 receives less thermal damage and its degradation is reduced.

Since the melting point of the intermetallic compound phase 12 is higher than the melting point of the high-temperature solder (183° C. to 240° C.), the conductive bonding material 20 can be used to bond the portion subjected to a higher temperature than the high-temperature solder.

Moreover, the conductive bonding material 20 does not take a molten state during the reaction like the high-temperature solder, and thus does not form a ball which might cause a short. According to the embodiment, the motor 100 that has a little possibility of a short can be provided. Moreover, the conductive bonding material 20 free of Pb, which is contained in a high-temperature solder, has little environmental load.

As illustrated in FIG. 4, the conductive bonding material 20 is preferably composed of a porous material including pores 26. The conductive bonding material 20 is provided adjacent to the slide-contact faces of the brush 7 and the commutator 6.

The brush 7 and the commutator 6 are heated by resistance loss, and frictional heat caused by slide contact are generated at the slide-contact faces of the brush 7 and the commutator 6. Here, the conductive bonding material 20 composed of a porous material offers a large specific surface area. A large area contacting the air stream produced by the rotation of the rotor 3 increases heat dissipation of the conductive bonding material 20.

A porosity of the conductive bonding material 20 below 5% can hardly provide an air cooling effect, whereas a porosity of the conductive bonding material 20 above 50% may result in insufficient strength. Thus, the porosity of the conductive bonding material 20 is preferably within a range from 5 to 50%.

A method for bonding together the slide-contact portion 51 (the first piece) and the fixing section 60 (the second piece) will now be described in detail.

Figure 5:
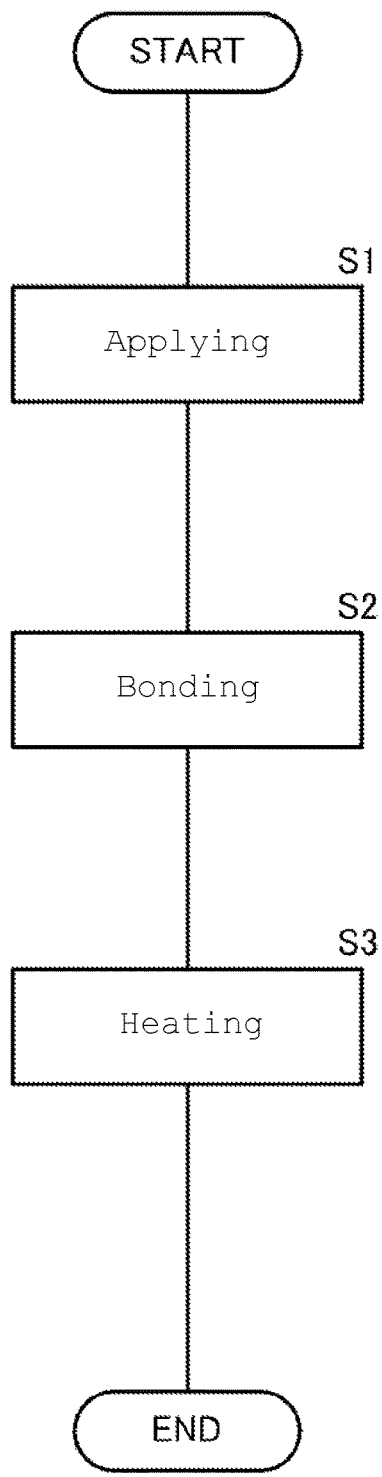
FIG. 5 is a flow chart of a method for bonding together the slide-contact portion 51 (the first piece) and the fixing section 60 (the second piece) illustrated in FIG. 2.
Figure 6:
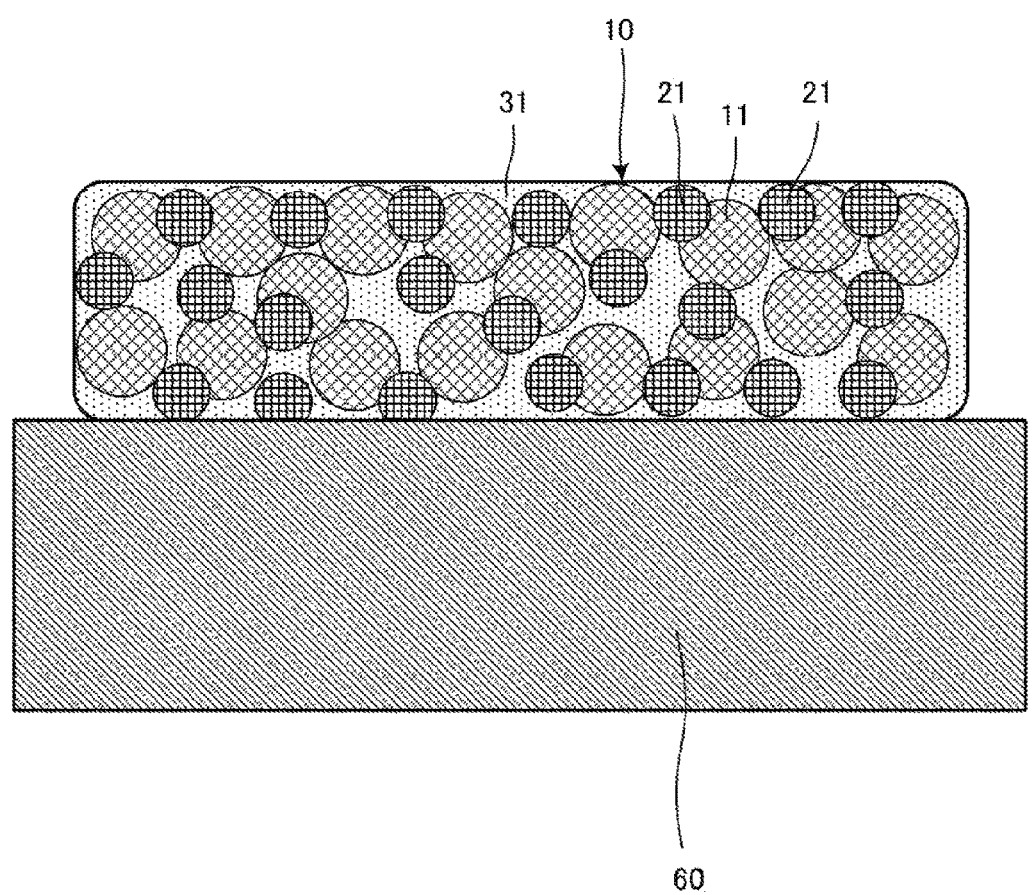
FIG. 6 is an enlarged sectional view schematically illustrating an applying step in FIG. 5.
Figure 7:
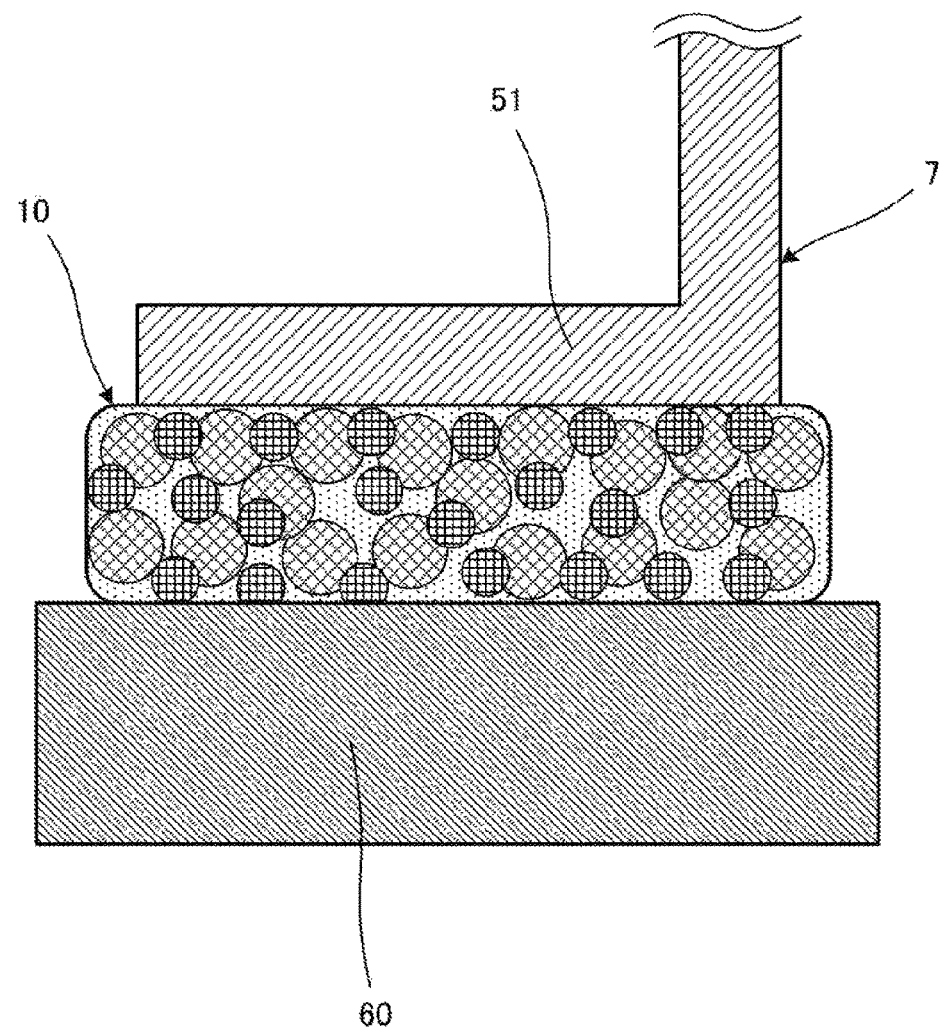
FIG. 7 is an enlarged sectional view schematically illustrating a bonding step in FIG. 5.
Figure 8:
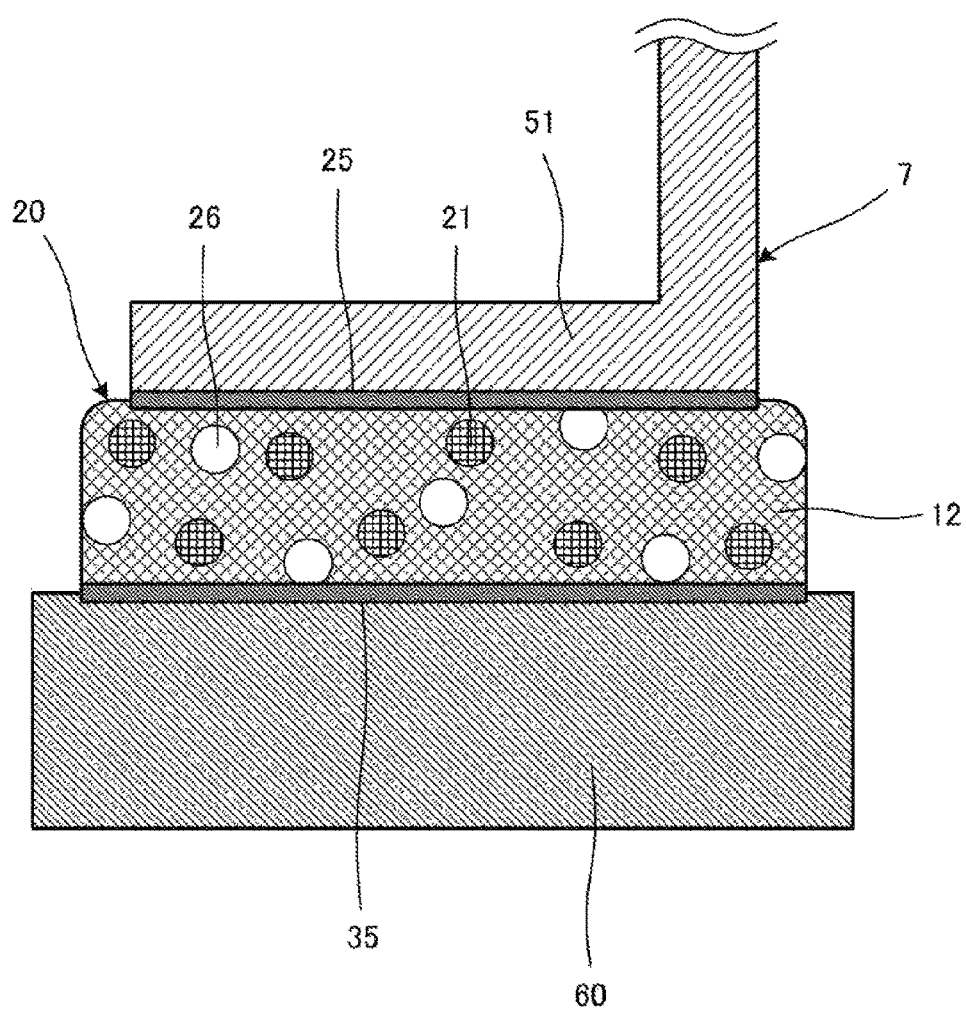
FIG. 8 is an enlarged sectional view schematically illustrating a heating step in FIG. 5.

FIG. 5 is a flow chart of a method for bonding together the slide-contact portion 51 (the first piece) and the fixing section 60 (the second piece) illustrated in FIG. 2. FIG. 6 is an enlarged sectional view schematically illustrating an applying step in FIG. 5. FIG. 7 is an enlarged sectional view schematically illustrating a bonding step in FIG. 5. FIG. 8 is an enlarged sectional view schematically illustrating a heating step in FIG. 5.

First, a metal paste 10 is prepared.

As illustrated in FIG. 6, the metal paste 10 is applied to at least either one of the slide-contact portion (the first piece) and the fixing section 60 (the second piece) (S1 in FIG. 5).

In the embodiment, the metal paste 10 is first applied to the fixing section 60 but can be first applied to the slide-contact portion 51.

The metal paste 10 is a metal composite material including powder particles of the first metal 11 and the second metal 21 in a paste layer 31. The first metal 11 is a pure metal of Sn. The second metal 21 is a CuNi alloy.

The metal paste 10 preferably includes a flux component as a paste layer 31. The flux component removes surface oxides such as Sn powder and CuNi alloy powder to promote surface activation. Rosin, organic acid, or diacid can be used as the flux component. The compounding amount is preferably 0.1 to 5% by weight of the total amount of the metal paste 10.

The metal paste 10 preferably includes a binder component as a paste layer 31. The binder component keeps metal paste 10 in the state of paste. For example, rosin, cellulosic derivative, acrylic resin, or phenol resin can be used as the binder component. The compounding amount is preferably 0.1 to 5% by weight of the total amount of the metal paste 10.

The compounding ratio of Sn powder and CuNi alloy powder is preferably within a range from 5:95 to 50:50 by weight. Excessive compounding amount of Sn powder may create a solder ball during bonding or cause Sn component to melt at high temperature. Excessive compounding amount of CuNi alloy powder may result in insufficient bonding strength.

Preferably, the Sn powder has an average particle size (D50) within a range from 5 to 50 μm and the CuNi alloy powder has an average particle size (D50) within a range from 0.1 to 80 μm.

The Sn powder having an average particle size below 5 μm may not melt. The Sn powder having an average particle size above 50 μm may cause variation in composition of the material resulting from the reaction, which might create a solder ball.

The CuNi alloy powder having an average particle size below 0.1 μm may result in poor wettability which may cause the CuNi alloy powder and the Sn powder to separate from each other. The CuNi alloy powder having an average particle size above 80 μm may result in insufficient bonding strength.

As illustrated in FIG. 7, the slide-contact portion (the first piece) and the fixing section 60 (the second piece) are bonded together (S2 in FIG. 5).

Then, as illustrated in FIG. 8, the bonding section that bonds together the slide-contact portion 51 (the first piece) and the fixing section 60 (the second piece) is heated at a predetermined temperature (250° C. in the embodiment) by a hot air gun, for example (S3 in FIG. 5).

By heating the metal paste 10 illustrated in FIG. 7, the conductive bonding material 20 illustrated in FIG. 8 is obtained. The conductive bonding material 20 is composed of the intermetallic compound phase 12, the second metal 21 and the pores 26 included in the intermetallic compound phase 12, the CuSn alloy layer 25, and the CuSn alloy layer 35.

In detail, heating of the metal paste 10 causes chemical reaction between the first metal and the second metal to produce the intermetallic compound (for example, $Cu_6Sn_5$, $Ni_3Sn_4$, $Cu_2NiSn$). The reaction is generated by, for example, transient liquid phase diffusion bonding (TLP bonding). The produced intermetallic compound is an alloy containing at least two selected from a group of Cu, Ni, and Sn. The melting point of the intermetallic compound is 300° C. or above, or in some cases, 400° C. or above. The conductive bonding material 20 has the intermetallic compound phase 12 as the main phase in which the second metal particles and the pores are dispersed.

Heating of the metal paste 10 also causes chemical reaction between the first metal 11 and the metal composing the slide-contact portion 51 to form the CuSn alloy layer 25. The intermetallic compound phase 12 and the slide-contact portion 51 are thereby firmly bonded together.

Heating of the metal paste 10 also causes chemical reaction between the first metal 11 and the metal composing the fixing section 60 to form the CuSn alloy layer 35. The intermetallic compound phase 12 and the fixing section 60 are thereby firmly bonded together.

CuNi alloy particles may remain in the intermetallic compound phase 12. Preferably, no remaining Sn particle substantially exists. Cu-10Ni alloy powder, for example, may be used as CuNi alloy powder.

Preferably, the heating temperature in S3 in FIG. 5 is about 230 to 350° C. Specifically, to avoid thermal damage to the adjacent member, the most preferable heating temperature in S3 is 250° C. The heating temperature is the measured temperature of the bonding section, not the temperature set in the hot air gun. The heating time in S3 is preferably about 1 to 10 minutes.

With a heating temperature below 230° C., Sn composing the first metal 11 may not melt, resulting in false bonding. This is because the melting temperature of Sn is 231.93° C.

With a heating temperature above 350° C., the adjacent member may deform. With a heating time shorter than one minute, Sn component may remain and melt at high temperature. With a heating time longer than ten minutes, the adjacent member may deform.

Other Embodiments

In the embodiment described above, the invention is applied to a motor that converts electric energy into rotational energy (torque). The invention is applicable not only to a motor. For example, the invention may be applied to a dynamo that converts rotational energy (torque) into electric energy.

In the embodiment, the conductive bonding material 20 is used to bond together the slide-contact portion 51 and the fixing section 60. The conductive bonding material 20 is not only used in such a manner. For example, the conductive bonding material 20 may be used to bond together the fixing section 60 of the brush 7 and a supporting portion that supports the brush 7 (for example, the inner face of the casing 9). Alternatively, the conductive bonding material 20 may be used to bond together the commutator 6 and an electrode that is connected to the commutator 6 (for example, the coil of the armature 5).

The first metal is pure Sn metal in the embodiment but not limited to such metal. The first metal of the embodiment may be an alloy containing Sn.

The second metal is a CuNi alloy in the embodiment but not limited to such an alloy. The second metal of the embodiment may be a CuMn alloy, an AgPd alloy, a CuAl alloy, or a CuCr alloy. For example, in a case where the second metal is a CuMn alloy, melted Sn (first metal) and the CuMn alloy (second metal) react with each other to produce an intermetallic compound containing at least two selected from a group of Cu, Mn, and Sn.

The metal paste 10 is provided as paste in the embodiment but not limited to such a form. A sheet (or a tape) having a composition similar to the metal paste 10 may be used.

The embodiments described above are all described by way of illustration, not by way of limiting the scope of the present invention. The scope of the present invention is determined by the claims, not by the embodiments. Alterations equivalent to the claims all fall within the scope of the present invention.

DESCRIPTION OF REFERENCE SYMBOLS

2: permanent magnet
3: rotor
4: rotor shaft
5: armature
6: commutator
7: brush
9: casing
10: metal paste
11: first metal
12: intermetallic compound phase
20: conductive bonding material
21: second metal
25: alloy layer
26: hole
31: paste layer
35: alloy layer
51: slide-contact portion
60: fixing section
71: slide-contact face
100: motor

The invention claimed is:

1. A rotary device comprising:
a first piece having a slide-contact face that contacts a rotating object of the rotary device;
a second piece; and
a conductive bonding material bonding the first piece to the second piece, the conductive bonding material including an intermetallic compound that is an alloy containing one of (1) at least two selected from a first group consisting of Sn, Cu and Ni, and (2) at least two selected from a second group consisting of Sn, Cu, and Mn,
wherein the conductive bonding material is a porous material.

2. The rotary device according to claim 1, wherein the intermetallic compound if the result of a reaction between a first metal which is Sn or an alloy including Sn and a second metal which is a CuNi alloy, a CuMn alloy, an AgPd alloy, a CuAl alloy, or a CuCr alloy.

3. The rotary device according to claim 2, wherein the first metal is an Sn powder and the second metal is a CuNi alloy powder.

4. The rotary device according to claim 3, wherein the Sn powder has an average D50 particle size within a range of 5 to 50 μm, and the CuNi alloy powder has an average D50 particle size within a range of 0.1 to 80 μm.

5. The rotary device according to claim 1, wherein the intermetallic compound includes a CuNiSn alloy.

6. The sliding member according to claim 1, wherein the intermetallic compound is one of $Cu_6Sn_5$, $Ni_3Sn_4$ and $Cu_2NiSn$.

7. The sliding member according to claim 1, wherein the conductive bonding material has a porosity of 5 to 50%.

8. The rotary device according to claim 1, wherein the conductive bonding material further includes at least one of a first alloy layer on a surface of the first piece and a second alloy layer on a surface of the second piece.

9. The rotary device according to claim 1, wherein the conductive bonding material further includes a first alloy layer on a surface of the first piece and a second alloy layer on a surface of the second piece.

10. The rotary device according to claim 1, wherein
the first piece is configured as a portion of a brush to serve as a slide-contact portion that contacts a commutator of the rotary device, and
the second piece is configured as a fixing section which connects to the rotary device.

11. The rotary device according to claim 1, wherein
the first piece is configured as a brush of the rotary device, and
the second piece is configured as a supporting portion that supports the brush.

12. The rotary device according to claim 1, wherein
the first piece is configured as a commutator of the rotary device; and
the second piece is configured as a coil connected to the commutator.

* * * * *